(12) United States Patent
Stiehl et al.

(10) Patent No.: US 8,348,010 B2
(45) Date of Patent: Jan. 8, 2013

(54) INVERTIBLE EAR TIPS FOR AN EAR PIECE

(75) Inventors: Kurt Stiehl, San Jose, CA (US); Emery Sanford, San Francisco, CA (US); Cameron Frazier, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/124,471

(22) Filed: May 21, 2008

(65) Prior Publication Data

US 2009/0101433 A1    Apr. 23, 2009

Related U.S. Application Data

(60) Provisional application No. 60/999,660, filed on Oct. 19, 2007.

(51) Int. Cl.
*H04R 25/02* (2006.01)
*H04R 25/00* (2006.01)

(52) U.S. Cl. ......... 181/130; 181/135; 381/380; 381/328

(58) Field of Classification Search ................. 181/129, 181/130, 131, 135; 128/867; 381/380, 371, 381/328, 329; 264/255, 295, 294
See application file for complete search history.

(56) References Cited

U.S. PATENT DOCUMENTS

| | | | | | |
|---|---|---|---|---|---|
| 2,803,308 | A | * | 8/1957 | Di Mattia | 181/135 |
| 2,888,921 | A | * | 6/1959 | Nielson et al. | 128/865 |
| 3,303,902 | A | * | 2/1967 | Knott | 181/135 |
| 3,710,888 | A | * | 1/1973 | Peart | 181/131 |
| 3,935,401 | A | * | 1/1976 | Shore et al. | 181/135 |
| 4,607,720 | A | * | 8/1986 | Hardt | 181/135 |
| 4,852,684 | A | * | 8/1989 | Packard | 181/131 |
| 4,879,750 | A | | 11/1989 | Nassler | |
| 4,880,076 | A | | 11/1989 | Ahlberg et al. | |
| 4,972,488 | A | | 11/1990 | Weiss et al. | |
| 5,002,151 | A | | 3/1991 | Oliveira et al. | |
| 5,288,953 | A | * | 2/1994 | Peart | 181/130 |
| 5,401,920 | A | | 3/1995 | Oliveira | |
| 5,449,865 | A | * | 9/1995 | Desnick et al. | 181/131 |
| 5,824,968 | A | * | 10/1998 | Packard et al. | 181/131 |
| 5,988,313 | A | * | 11/1999 | Håkansson | 181/135 |
| 6,129,174 | A | * | 10/2000 | Brown et al. | 181/135 |
| 6,513,621 | B1 | * | 2/2003 | Deslauriers et al. | 181/130 |
| 6,671,381 | B1 | | 12/2003 | Lux-Wellenhof | |
| 6,860,362 | B2 | * | 3/2005 | Saltykov | 181/135 |
| 6,938,622 | B2 | * | 9/2005 | Huang | 128/864 |
| 7,349,550 | B2 | | 3/2008 | Oliveira et al. | |

(Continued)

OTHER PUBLICATIONS

Office Action for U.S. Appl. No. 12/205,749, mailed Aug. 31, 2011.

(Continued)

*Primary Examiner* — Edgardo San Martin

(74) *Attorney, Agent, or Firm* — Kramer Levin Naftalis & Frankel LLP

(57) ABSTRACT

An ear piece for providing audio (e.g., from an electronic device) to the user is provided. The ear piece may include a compliant element operative to be inserted in the user's ear such that the compliant element deforms to retain the ear piece in the user's ear. The compliant element may include a connector portion coupling the compliant element to the ear piece housing, and an outer portion folded over the ear piece housing. To improve the user's comfort, the parting lines and other manufacturing defects may be hidden from view and from touch (e.g., the parting lines are on the inner surface of the outer portion).

31 Claims, 2 Drawing Sheets

U.S. PATENT DOCUMENTS

| | | | |
|---|---|---|---|
| 7,464,786 B2 * | 12/2008 | Falco et al. | 181/135 |
| 7,548,629 B1 * | 6/2009 | Griffin | 381/382 |
| 7,627,131 B2 * | 12/2009 | Nielsen et al. | 381/328 |
| 2002/0085728 A1 | 7/2002 | Shennib et al. | |
| 2003/0051939 A1 * | 3/2003 | Werblud | 181/131 |
| 2004/0062412 A1 | 4/2004 | Nassimi | |
| 2005/0094835 A1 * | 5/2005 | Doty | 381/328 |
| 2006/0147071 A1 | 7/2006 | Neilson | |
| 2006/0171549 A1 | 8/2006 | Holmes | |
| 2006/0180387 A1 * | 8/2006 | Elliott | 181/135 |
| 2006/0233411 A1 * | 10/2006 | Utigard | 381/328 |
| 2007/0189570 A1 * | 8/2007 | Matsuo et al. | 381/382 |
| 2007/0201717 A1 | 8/2007 | Dyer et al. | |
| 2007/0221232 A1 * | 9/2007 | Jenkins | 128/864 |
| 2007/0284182 A1 * | 12/2007 | Mu | 181/135 |
| 2008/0013767 A1 * | 1/2008 | Olsen et al. | 381/328 |
| 2008/0031481 A1 | 2/2008 | Warren | |
| 2008/0187159 A1 * | 8/2008 | Blanchard | 381/328 |
| 2008/0187161 A1 * | 8/2008 | Tiemens et al. | 381/380 |
| 2008/0205679 A1 * | 8/2008 | Darbut et al. | 381/328 |
| 2008/0240485 A1 * | 10/2008 | Dyer et al. | 381/380 |
| 2008/0240486 A1 | 10/2008 | Garcia | |
| 2009/0052711 A1 * | 2/2009 | Murozaki | 381/328 |
| 2009/0101433 A1 | 4/2009 | Stiehl et al. | |
| 2009/0103760 A1 * | 4/2009 | Stiehl et al. | 381/371 |
| 2009/0103764 A1 * | 4/2009 | Stiehl et al. | 381/380 |
| 2009/0136074 A1 * | 5/2009 | Chang et al. | 381/380 |
| 2009/0233652 A1 * | 9/2009 | Yang | 455/569.1 |
| 2009/0304220 A1 * | 12/2009 | Fujikura et al. | 381/380 |

OTHER PUBLICATIONS

Final Office Action for U.S. Appl. No. 12/205,749, mailed Jan. 19, 2012.
Office Action for U.S. Appl. No. 12/205,748, mailed Aug. 31, 2011.
Final Office Action for U.S. Appl. No. 12/205,748, mailed Feb. 2, 2012.
Notice of Allowance for U.S. Appl. No. 12/205,748, mailed May 1, 2012.
Notice of Allowance for U.S. Appl. No. 12/794,690, mailed May 25, 2012.
Notice of Allowance for U.S. Appl. No. 12/205,749, mailed May 8, 2012.

* cited by examiner

INVERTIBLE EAR TIPS FOR AN EAR PIECE

CROSS-REFERENCE TO RELATED APPLICATION

This application claims the benefit of U.S. Provisional Patent Application No. 60/999,660, filed Oct. 19, 2007, which is incorporated herein in its entirety.

BACKGROUND OF THE INVENTION

Several different approaches can be used to provide audio from an electronic device to a user. For example, the electronic device may include or be coupled to a speaker or speaker system operative to provide audio. As another example, the electronic device may be coupled to a headset or headphone for providing audio directly to the user's ears. To improve a user's comfort, a headset or headphone may include one or more elements operative to provide a pleasant interface between the audio components of the headset (e.g., the ear piece) and the user's ears.

For example, some headsets may include an over-the-ear type ear piece that is operative to be placed on or over the user's ear. The ear piece may include one or more foam or cloth components that provide a compliant fit against the user's ear. As another example, some headsets may include an in-the-ear type ear piece (e.g., an earbud) operative to fit inside the user's ear. To provide a comfortable fit for the user, the ear piece may include a compliant outer portion operative to adjust to the shape of the user's ear, thus providing a firm and secure fit that remains comfortable. For example, the compliant outer portion may include a tubular structure coupled to the ear piece and forming a flexible structure surrounding the ear piece.

The compliant outer portion may be manufactured using any suitable approach. For example, it may be manufactured using a molding process. When using a molding process, however, a parting line is formed along the area of the outer surface where the material used for the surface is injected into the mold. The parting line creates a visual break in the outer surface and produces a physically detectable variation in the smoothness of the surface. This may be a source of discomfort to the user, and create a less visually pleasant ear piece.

SUMMARY OF THE INVENTION

A compliant outer portion coupled to an ear piece for use with an electronic device used to provide audio to a user is provided.

The ear piece may include one or more audio components operative to process signals received from the electronic device and generate an audio output for the user. The audio components may be coupled to the electronic device using any suitable approach, including for example wirelessly (e.g., using a Bluetooth or wireless protocol), or using a cable.

The ear piece may be operative to be placed in the user's ear. To improve the fit of the ear piece within the user's ear, the ear piece may be substantially surrounded by a compliant element. The compliant element may include a curved portion extending away from the ear piece such that the curved portion is placed in contact with the user's ear when the ear piece is inserted. In some embodiments, the compliant element may be larger than the user's ear such that the compliant element may elastically deform, creating an interference fit between the user's ear and the ear piece.

The compliant element may be manufactured using a molding process (e.g., an injection molding process). To eliminate the parting line on the surface of the compliant element that is in contact with the user's ear, the compliant element may be manufactured at least partially inverted. In other words, the compliant surface may be manufactured such that the parting line is along the inner surface of the curved portion. Then, once manufactured and inverted, the parting line will be located on the surface of the curved outer portion that faces towards the ear piece, and not towards the user's ear.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
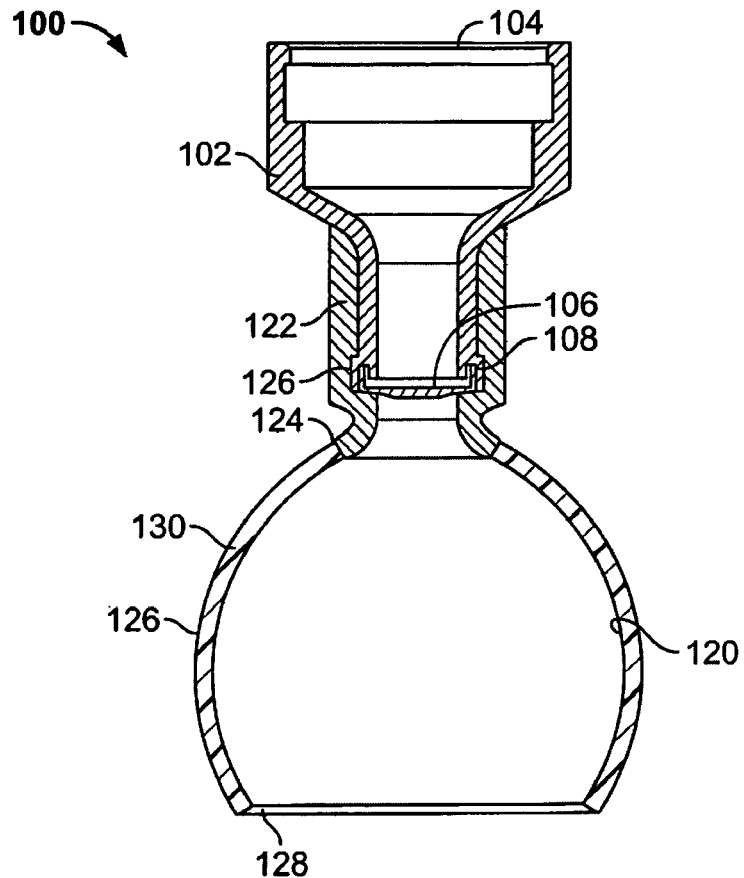
FIG. 1 is a cross-sectional view of an ear piece having an inverted compliant element in accordance with one embodiment of the invention.

FIG. 1 is a cross-sectional view of an ear piece having an inverted compliant element in accordance with one embodiment of the invention. Ear piece 100 may include base 102 housing the acoustic elements of ear piece 100. Base 102 may be shaped in any suitable manner, including for example in a substantially cylindrical shape (e.g., as the combination of several cylinders having different sizes). End 104 of base 102 may include one or more coupling elements for connecting base 102 to a second ear piece 100 (e.g., connecting the left and right ear pieces) or to an electronic device from which audio may be received (e.g., a coupling element including a cable). End 106 of base 102 may include an opening through which audio, processed and generated by audio components of ear piece 100, may be provided to the user. End 106 of base 102 may be sized such that end 106 may comfortably fit the user's ears. In some embodiments, end 106 may be substantially smaller than the user's ear to allow for an easy and comfortable fit.

End 106 may include ridge 108 extending from the periphery of base 102. For example, ridge 108 may be a cylinder having a slightly larger radius than the rest of end 106. As another example, ridge 108 may create a localized feature or pattern of features (e.g., a ridge that does not extend entirely around the periphery of base 102). Ridge 108 may be shaped in any suitable manner (e.g., have any suitable cross-section), and may include any suitable feature for engaging or coupling other elements of ear piece 100. For example, ridge 108 may have a triangular, rectangular, polygonal, circular, or oval cross-section. As another example, ridge 108 may include one or more engagement features, such as a hook, protrusion, overhang, or other feature operative to engage a corresponding feature in another component.

Base 102 may be constructed from any suitable material. In some embodiments, base 102 may be constructed from a material having sufficient rigidity and strength to protect the acoustic elements housed in base 102. For example, base 102 may be constructed from metal, plastic, a composite material, or any other suitable material (e.g., a hard material). In some embodiments, different portions of base 102 may be constructed with different materials, for example to improve the acoustic performance of ear piece 100 (e.g., end 104 may be constructed from a substantially plastic material, and end 106 may be constructed from a substantially metallic material). Because base 102 may be hard, base 102 may not be comfortable for the user. Accordingly, compliant element 120 may be coupled to base 102 to provide a comfortable interface between ear piece 100 and the user's ear.

Compliant element 120 may include coupling portion 122 and outer portion 130, which may be connected at interface 124. Coupling portion 122 may include a substantially cylindrical structure having open ends and operative to engage end 106 of base 102. For example, the inner surface of coupling portion 122 may include groove 126 placed opposite and operative to receive ridge 108. As another example, coupling portion 122 may include any other configuration corresponding to a feature of end 106 (e.g., an indentation for receiving a hook). In some embodiments, coupling portion 122 may be coupled to end 106 without using geometric or structural elements. For example, coupling portion 122 may be coupled to end 106 using an adhesive, tape, heat staking or heat treatment, an interference fit, a gasket, a mechanical fastener, combinations thereof, or any other suitable approach. In some embodiments, compliant element 120 may be manufactured as part of base 102 (e.g., molded into base 102, for example in a double-shot molding process).

Outer portion 130 may extend distally away from coupling portion 122 at interface 124 along the axis of coupling portion 122. Outer portion 130 may have any suitable shape, including for example a substantially curved cylindrical shape (e.g., having a variable circular or elliptical cross-section). To provide a comfortable fit all the way around end 106, outer portion may form a tubular structure that extends entirely around the periphery of base 102. The shape and length of outer portion 130 may be selected based on the size of an average user's ear, such that outer portion 130 may deflect to receive the user's ear, thus providing an interference-type fit, but not deflect so much as to create significant pressure against the user's ear. For example, outer portion 130 may include a concave structure such that the diameter of outer portion 130 at interface 124 and tip 128 may be less than the diameter of outer portion at area 126 (e.g., where material is injected into a mold to form compliant element 120). Outer portion 130 may be substantially smooth for ease of manufacturing and to ensure a comfortable fit.

Compliant element 120 may be constructed from any suitable material. In some embodiments, coupling portion 122 and outer portion 130 may be constructed from different materials (e.g., in different colors for aesthetic reasons, for example coupling portion 122 may be white and outer portion 130 may be clear or substantially transparent or translucent). Any suitable material may be used for either portion of compliant element 120, including for example silicone, rubber, latex, foam, or any other suitable material. In some embodiments, compliant element 120 (or at least outer portion 130) may be manufactured from an elastic material (e.g., an elastomer or other composite material) operative to deform when ear piece 100 is placed in the user's ear such that compliant element 120 may expand and retain ear piece 100 comfortably in the user's ear. In some embodiments, the material used for compliant element 120 may be selected based on its acoustic properties (e.g., based on the material's acoustical absorption).

Compliant element 120 may be manufactured using any suitable approach. In some embodiments, compliant element 120 may be manufactured using a molding process. To easily create compliant element 120, material may be injected into the mold along an outermost portion of compliant element 120. In the example of FIG. 1, material may be injected at area 126 (e.g., a single line going around the periphery of compliant element 120, for example along the equator of outer portion 130). When the molding process is finished, and all of the material has been suitably inserted in the mold, a parting line remains at area 126. The parting line may be visible to the user's eye, and create a ridge or bump that is detectable by the user's finger (and may be uncomfortable in the user's ear). If other manufacturing techniques are used, outer portion 130 may include other defects or roughness inherent to the manufacturing, for example around area 126.

Figure 2:
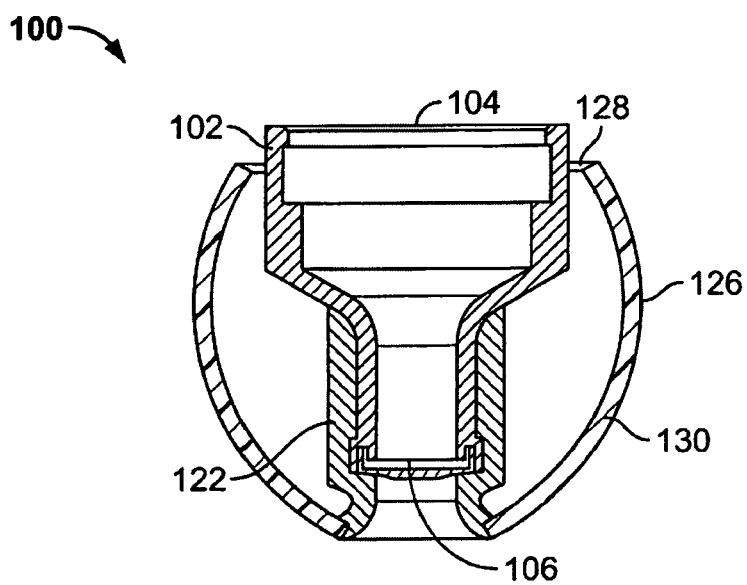
FIG. 2 is a cross-sectional view of the ear piece of FIG. 1 in which the compliant element is inverted back over the ear piece in accordance with one embodiment of the invention.

To hide the parting line of area 126 from the user and to make ear piece 100 more comfortable once inserted in the user's ear, compliant element 120 may be inverted. FIG. 2 is a cross-sectional view of the ear piece of FIG. 1 in which the compliant surface is inverted back over the ear piece in accordance with one embodiment of the invention. As shown in FIG. 2, outer portion 130 may be inverted over coupling portion 122 such that outer portion 130 is placed over the outer surface of base 102. Then, tip 128 may be closer to end 104 of housing 102 than interface 124 (e.g., contrary to prior to inversion, as shown in FIG. 1). Outer portion 130 may retain a concave shape to ensure the user's comfort as ear piece 100 is inserted in the user's ear.

Once outer portion 130 is inverted, the parting line at area 126 may be on the inner surface of outer portion 130 (e.g., away from the user's ear) such that the surface of outer portion 130 (e.g., the inner surface pre-inversion in FIG. 1) placed against the user's ear is substantially smooth. Using this inversion approach, the manufacturing defects or roughness may be hidden from view, thus providing the user with a more comfortable and more aesthetically pleasing product.

In some embodiments, compliant element 120, when manufactured in an inverted form (e.g., as in FIG. 1), may be shaped different than a compliant element manufactured directly in the final shape (e.g., as in FIG. 2), and subsequently inverted. In particular, it may not be possible to simply create a mold based on the inverted shape of a compliant element manufactured directly in the final shape due to stresses inherent to the material when it is shaped.

Figure 3:
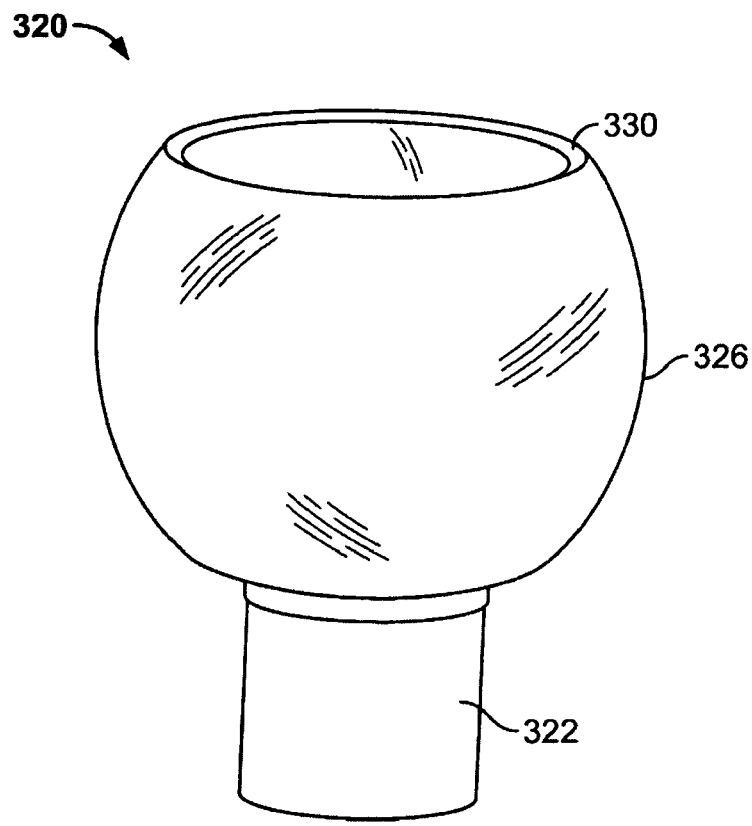
FIG. 3 is a schematic view of a compliant element for use with an ear piece as molded in accordance with one embodiment of the invention.

FIG. 3 is a schematic view of a compliant element for use with an ear piece as molded in accordance with one embodiment of the invention. Compliant element 320 may include coupling portion 322 and outer portion 330, which may include some or all of the features of portions of compliant element 120, described above. As shown in FIG. 3, parting line 326 may be located along the exposed surface of outer portion 330.

Figure 4:
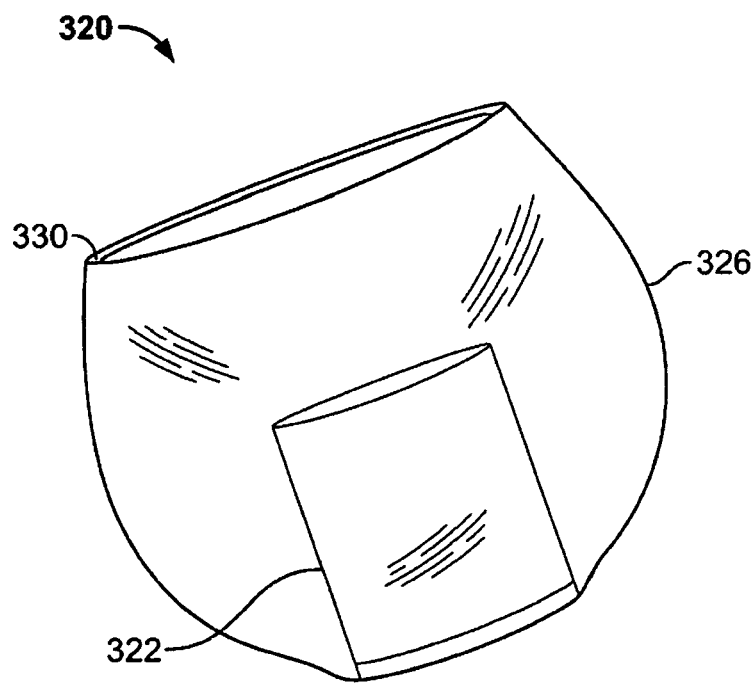
FIG. 4 is a schematic view of the compliant element of FIG. 3 once it has been inverted after molding in accordance with one embodiment of the invention.

FIG. 4 is a schematic view of the compliant element of FIG. 3 once it has been inverted after molding in accordance with one embodiment of the invention. As shown in FIG. 4, outer portion 330 of compliant element 320 may be inverted and folded back over coupling portion 322. Once inverted, parting line 326 may be on the surface of outer portion that is adjacent coupling portion 320, and not adjacent the user's ear.

In some embodiments, other areas of the compliant element may be used to inject or provide material used to manufacture the compliant element. For example, with reference to FIG. 1, material may be injected at end 128 of outer portion 130, end 121 of coupling portion 122, or any other location of compliant element 120 that does not come into contact with the user's ear. In some embodiments, the location may be selected such that compliant element 120 can be manufactured directly in its final form (e.g., at end 128, FIG. 2).

The above described embodiments of the present invention are presented for purposes of illustration and not of limitation, and the present invention is limited only by the claims which follow.

What is claimed is:

1. A method for manufacturing a compliant element for use in an ear piece, comprising:
    defining a mold for a compliant element comprising a coupling portion and an outer portion, the coupling portion forming a substantially cylindrical structure from a coupling portion material, and the outer portion formed of an outer portion material and extending beyond the distal end of the coupling portion along the axis of the coupling portion;
    injecting material into the mold at an injection point located along the periphery of the outer portion to form the outer portion such that the coupling portion and the outer portion are molded to one another; and
    inverting the outer portion over the coupling portion such that the injection point is located between the outer portion and the coupling portion,
    wherein the coupling portion material is different than the outer portion material, and the coupling portion material is more rigid than the outer portion material.

2. The method of claim 1, wherein the outer portion forms a substantially curved cylindrical shape.

3. The method of claim 2, wherein the cross section of the outer portion comprises a variable size.

4. The method of claim 3, wherein the variable size is a variable diameter.

5. The method of claim 1, wherein the outer portion material is at least one of silicone, rubber, latex and foam.

6. The method of claim 1, further comprising:
    manufacturing the coupling portion using a first manufacturing process; and
    placing the manufactured coupling portion in the defined mold.

7. The method of claim 6, wherein the coupling portion material comprises silicone, and the outer portion material comprises at least one of silicone and foam.

8. A compliant element for use in an ear piece, comprising:
    a substantially cylindrical coupling portion comprising an upper and a lower boundary, the coupling portion defining a central axis, and the coupling portion formed from a first material, the coupling portion having a first end configured to include one or more coupling elements to facilitate connection with the ear piece, the coupling portion having a second end configured to include at least one groove, the at least one groove being configured to secure the coupling portion and thus the compliant element to a housing of the ear piece, and the second end being smaller than the first end; and
    an outer portion connected to the coupling portion, the outer portion being formed from a second material, and the outer portion having a uniform thickness and operative to extend beyond the upper boundary of the coupling portion along the central axis, wherein the parting line from manufacturing the compliant element is located on the surface of the outer portion facing away from the axis of the coupling portion,
    wherein the first material is different than the second material, and the first material is more rigid than the second material, and
    wherein the coupling portion is molded from the first material, and wherein the outer portion is molded from the second material.

9. The compliant element of claim 8, wherein the coupling portion comprises silicone.

10. The compliant element of claim 8, wherein the outer portion is inverted over the coupling portion such that the surface of the outer portion that includes the parting line faces the coupling portion.

11. The compliant element of claim 10, wherein the surface of the outer portion that faces away from the coupling portion is substantially smooth.

12. The compliant element of claim 10, wherein the outer portion is substantially concave after being inverted.

13. The compliant element of claim 10, wherein the outer portion is operative to deform elastically when the compliant element is placed in a user's ear.

14. The compliant element of claim 8, wherein the outer portion is substantially concave prior to being inverted.

15. The compliant element of claim 8, wherein the outer portion is molded onto the coupling portion.

16. The compliant element of claim 8, wherein the first material is white, and wherein the second material is substantially clear.

17. An ear piece for providing audio to an electronic device, comprising:
    a housing enclosing acoustic elements operative to provide audio to the user; and
    a compliant element coupled to the housing, the compliant element comprising:
        a curved cylindrical outer portion formed from an outer portion material and operative to be placed in a user's ear, wherein the area at which material was provided to form the compliant element is on a surface of the outer portion that faces away from the user's ear; and
        a coupling portion extending from an end of the outer portion, the coupling portion being formed from a coupling portion material that is different than the outer portion material, and the coupling portion material being more rigid than the outer portion material, the coupling portion having a first end configured to include one or more non-threaded coupling elements to facilitate connection with the housing, the coupling portion having a second end, and the second end being smaller than the first end.

18. The ear piece of claim 17, wherein the outer portion is inverted after manufacturing.

19. The ear piece of claim 17, wherein the coupling portion attached to the outer portion such that during manufacturing, the tip of the outer portion extends away from the coupling portion.

20. The ear piece of claim 19, wherein the outer portion is inverted over the coupling portion such that the tip of the outer portion is placed adjacent the coupling portion.

21. The ear piece of claim 19, wherein:
    the housing comprises a first structural element; and
    the coupling portion comprises a second structural element operative to engage the first structural element.

22. The ear piece of claim 19, wherein the coupling portion is coupled to the housing using at least one of an adhesive, tape, heat staking, an interference fit, a gasket and a mechanical fastener.

23. The ear piece of claim 19, wherein the coupling portion is manufactured using a first molding process, and wherein the outer portion is connected to the coupling portion using a second molding process.

24. The ear piece of claim 23, wherein the coupling portion and the outer portion are molded from different materials.

25. The ear piece of claim 17, wherein the outer portion material comprises at least one of silicone, rubber, latex and foam.

26. The compliant element of claim 17, wherein the coupling portion material is substantially translucent.

27. The compliant element of claim 26, wherein the coupling portion material comprises silicone.

28. The compliant element of claim 8, wherein the second material is substantially translucent.

29. The compliant element of claim 8, wherein the second material comprises silicone.

30. The compliant element of claim 8, wherein the second material comprises foam.

31. The compliant element of claim 8, wherein the second material comprises silicone and foam.

* * * * *